(12) United States Patent
Tsumagari

(10) Patent No.: US 8,334,631 B2
(45) Date of Patent: Dec. 18, 2012

(54) ROTATING ELECTRICAL MACHINE

(75) Inventor: Hiroshi Tsumagari, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 225 days.

(21) Appl. No.: 13/004,901

(22) Filed: Jan. 12, 2011

(65) Prior Publication Data

US 2011/0169368 A1    Jul. 14, 2011

(30) Foreign Application Priority Data

Jan. 13, 2010 (JP) ................ 2010-004578

(51) Int. Cl.
*H02K 1/06* (2006.01)
(52) U.S. Cl. .............. 310/216.016; 310/216.015
(58) Field of Classification Search .......... 310/216.001–216.019
See application file for complete search history.

(56) References Cited

U.S. PATENT DOCUMENTS

| | | | | |
|---|---|---|---|---|
| 2,774,000 A | * | 12/1956 | Ross ............. | 310/216.006 |
| 4,012,653 A | * | 3/1977 | Shigeta et al. ........ | 310/432 |
| 4,330,726 A | * | 5/1982 | Albright et al. ....... | 310/216.015 |
| 4,375,043 A | * | 2/1983 | Roger ................. | 310/216.015 |
| 4,381,464 A | * | 4/1983 | Schnyder ............. | 310/45 |
| 5,477,096 A | * | 12/1995 | Sakashita et al. ...... | 310/216.016 |
| 7,456,539 B2 | * | 11/2008 | Matsumoto et al. .... | 310/156.21 |
| 2007/0085441 A1 | * | 4/2007 | Kao ................. | 310/218 |

FOREIGN PATENT DOCUMENTS

JP    01-264548    10/1989

* cited by examiner

*Primary Examiner* — Thanh Lam
(74) *Attorney, Agent, or Firm* — Ditthavong Mori & Steiner, P.C.

(57) ABSTRACT

A rotating electrical machine includes a stator including a stator core and a rotor. The stator core includes an annular-shaped first stack core and an annular-shaped second stack core. The first stack core includes first core pieces and first couplers. The first core pieces are spirally stacked. The first couplers mutually couple the first core pieces. The second stack core includes second core pieces and second couplers. The second core pieces are spirally stacked. The second couplers mutually couple the second core pieces. An outside shape of the second stack core is larger than an outside shape of the first stack core in a radial direction. The first stack core and the second stack core are alternately arranged in a stack direction. The rotor is provided on an inner peripheral side of the first stack core and the second stack core.

17 Claims, 9 Drawing Sheets

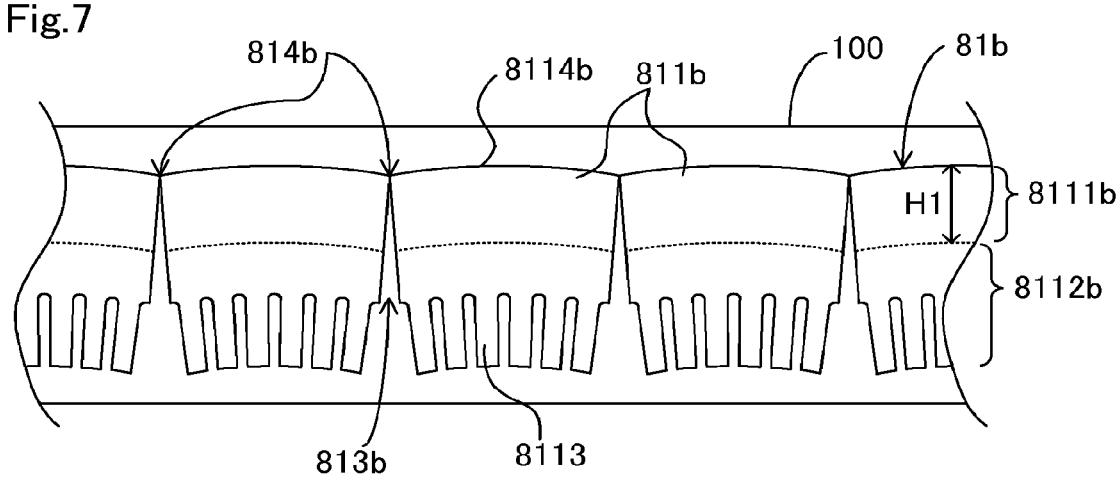

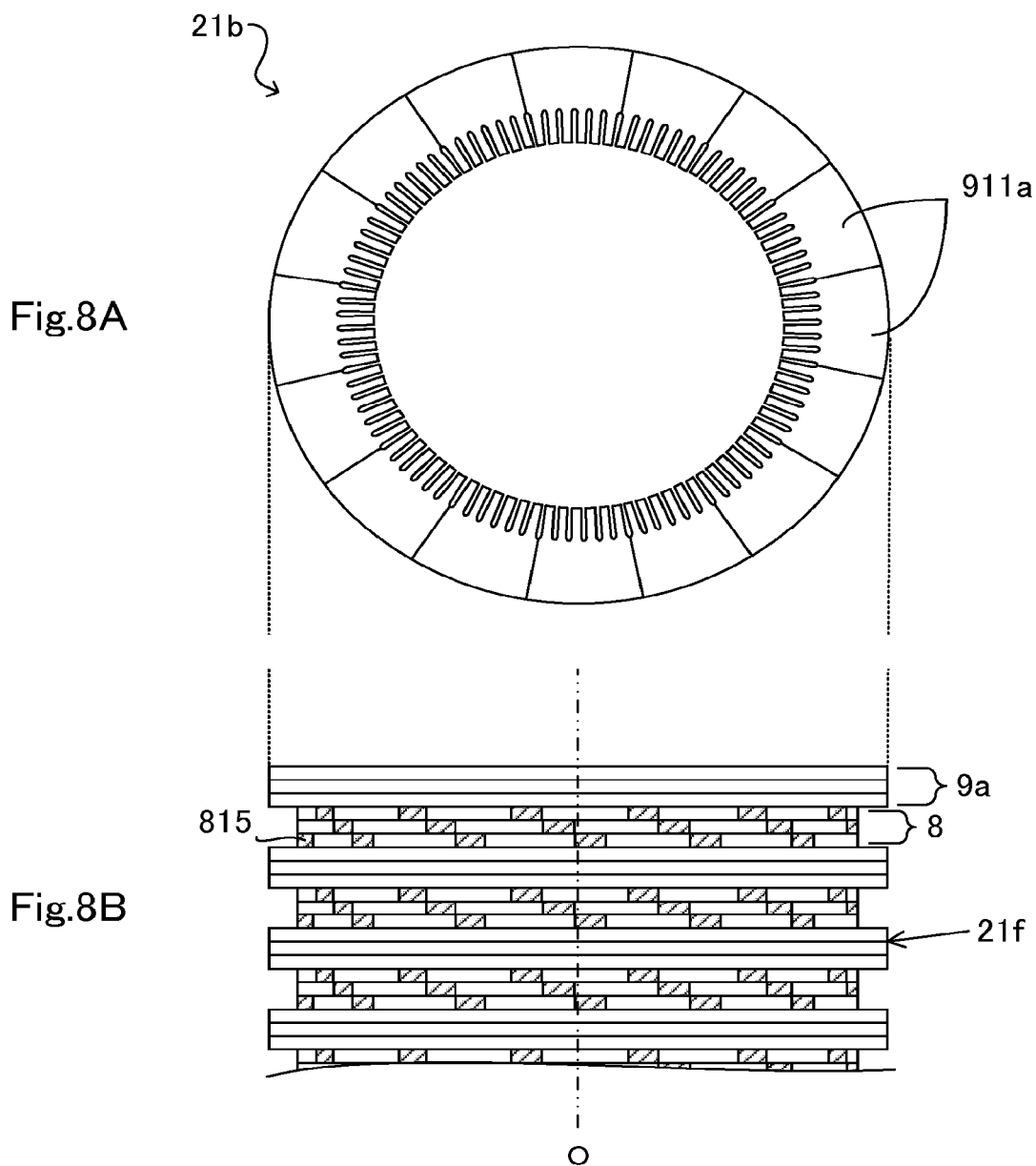

ROTATING ELECTRICAL MACHINE

CROSS-REFERENCE TO RELATED APPLICATIONS

The present application claims priority under 35 U.S.C. §119 to Japanese Patent Application No. 2010-004578 filed on Jan. 13, 2010. The contents of this application are incorporated herein by reference in their entirety.

BACKGROUND OF THE INVENTION

1. Field of the Invention

The present invention relates to a rotating electrical machine.

2. Description of the Related Art

In Japanese Unexamined Patent Publication No. 1989-264548, a technique of manufacturing a stator core by spirally stacking a band-shaped core is proposed. In the technique, the stator core is manufactured by spirally stacking a band-shaped core made of a plurality of core pieces mutually coupled by a coupler. The coupler is provided between the outer peripheries of the core pieces.

SUMMARY OF THE INVENTION

According to one aspect of the present invention, a rotating electrical machine includes a stator and a rotor. The stator includes a stator core. The stator core includes an annular-shaped first stack core and an annular-shaped second stack core. The first stack core includes a plurality of first core pieces and first couplers. The plurality of first core pieces are spirally stacked. The first couplers mutually couple the plurality of first core pieces. The second stack core includes a plurality of second core pieces and second couplers. The plurality of second core pieces are spirally stacked. The second couplers mutually couple the plurality of second core pieces. An outside shape of the second stack core is larger than an outside shape of the first stack core in a radial direction. The first stack core and the second stack core are alternately arranged in a stack direction. The rotor is provided on an inner peripheral side of the first stack core and the second stack core.

According to another aspect of the present invention, a rotating electrical machine includes a stator and a rotor. The stator includes a stator core. The stator core includes an annular-shaped first stack core and an annular-shaped second stack core. The first stack core includes a plurality of first core pieces and first couplers. The plurality of first core pieces are spirally stacked. The first couplers mutually couple the plurality of first core pieces. The second stack core includes a plurality of second core pieces and second couplers. The plurality of second core pieces are spirally stacked. The second couplers mutually couple the plurality of second core pieces. An outside shape of the second stack core is larger than an outside shape of the first stack core in a radial direction. The rotor is provided on an inner peripheral side of the first stack core and the second stack core.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a view showing an example of component members of the stator core;

FIGS. 8A and 8B are views showing a configuration example of a stator core; and

DESCRIPTION OF THE EMBODIMENTS

Figure 1:
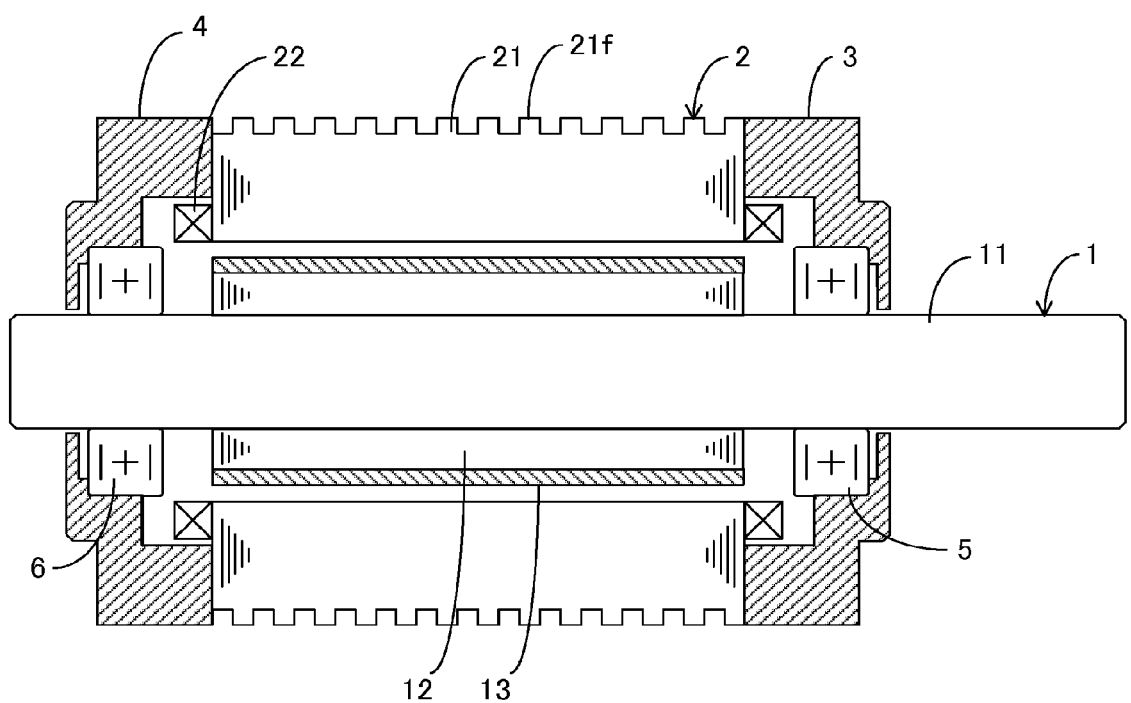
FIG. 1 is a view showing a configuration example of a rotating electrical machine according to a first embodiment of the present invention.

Embodiments will now be described with reference to the accompanying drawings, wherein like reference numerals designate corresponding or identical elements throughout the various drawings.

First Embodiment

Referring now to FIG. 1, the configuration of a rotating electrical machine according to a first embodiment of the present invention will be described. FIG. 1 is a view showing a configuration example of the rotating electrical machine according to the first embodiment of the present invention. FIG. 1 shows a side section of the rotating electrical machine. In FIG. 1, the rotating electrical machine has a rotor 1, a stator 2, a load-side bracket 3, an opposite-side bracket 4, a load-side bearing 5, and an opposite-side bearing 6.

The rotor 1 has a shaft 11, a rotor core 12, and a permanent magnet 13. The rotor core 12 has a cylindrical shape and is provided around the columnar shaft 11. The permanent magnet 13 is provided on the outer peripheral face of the rotor core 12. In the embodiment, the structure of the rotor 1 is an SPM structure that the permanent magnet 13 is provided on the outer peripheral face of the shaft 11. However, the structure may be an IPM structure or an IM structure. The stator 2 has a stator core 21 and a stator coil 22. The stator core 21 is provided so as to surround the periphery side of the rotor core 12. Teeth are formed on the inner peripheral side of the stator core 21, and the stator coil 22 is provided between the teeth. In the outer periphery of the stator core 21, a radial fin 21f projecting in the radial direction of the stator core 21 is formed. The detailed configuration of the stator core 21 will be described later. The rotor core 12 and the permanent magnet 13 rotate in the circumferential direction by the magnetic field generated by the stator coil 22. The load-side bracket 3 is provided at a load-side end as one end of the stator core 21 in the rotation axis direction. The opposite-side bracket 4 is provided at an opposite-side end as the other end of the stator core 21 in the rotation axis direction. The shaft 11 is rotatably supported by the load-side bearing 5 provided between the shaft 11 and the load-side bracket 3 and the opposite-side bearing 6 provided between the shaft 11 and the opposite-side bracket 4. The shaft 11 rotates with the rotor core 12 and the permanent magnet 13. The stator 2 may also have a frame (not shown). The frame is provided for the outer periphery of the stator core 21 and has a structure in which an opening for exposing the outer periphery of the stator core 21 to the outside is formed. In this case, the load-side bracket 3 is provided at the load-side end as one end of the frame in the rotation axis direction. The opposite-side bracket 4 is provided at the opposite-side end as the other end of the frame in the rotation axis direction.

Figure 2A:
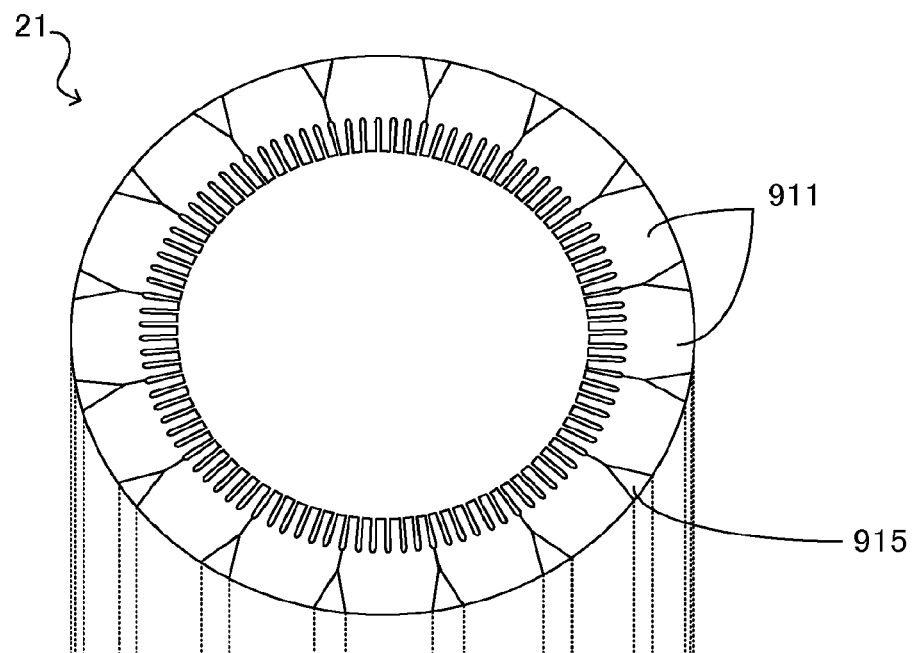
FIGS. 2A and 2B are views showing a configuration example of a stator core.
Figure 2B:
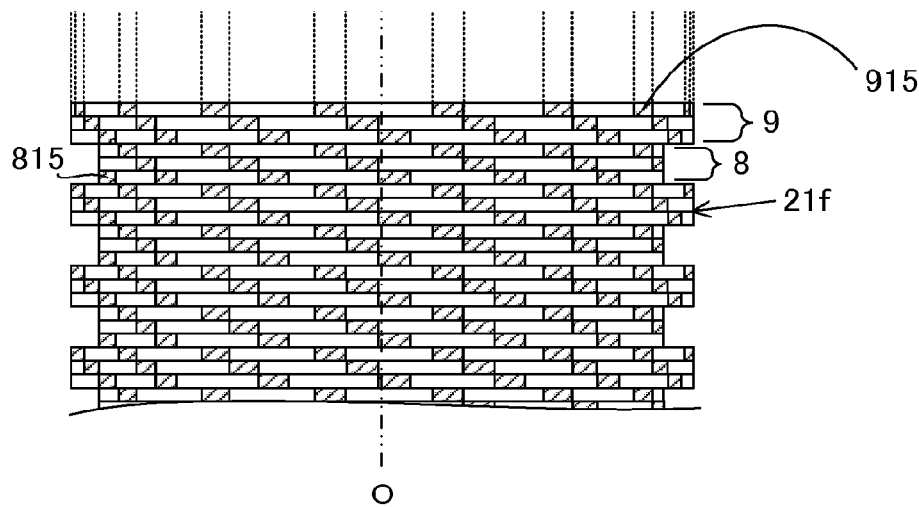
Figure 3:
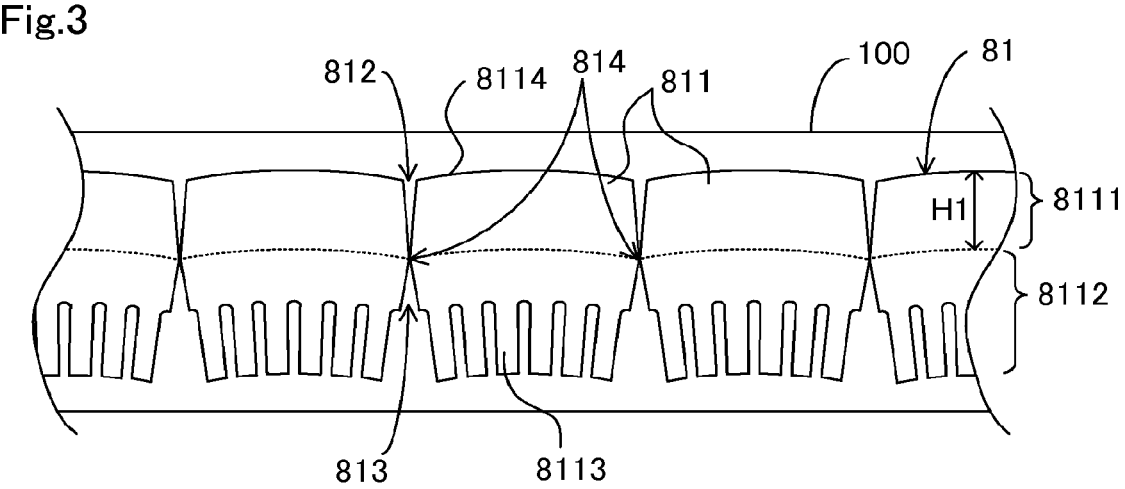
FIG. 3 is a view showing an example of component members of the stator core.
Figure 4:
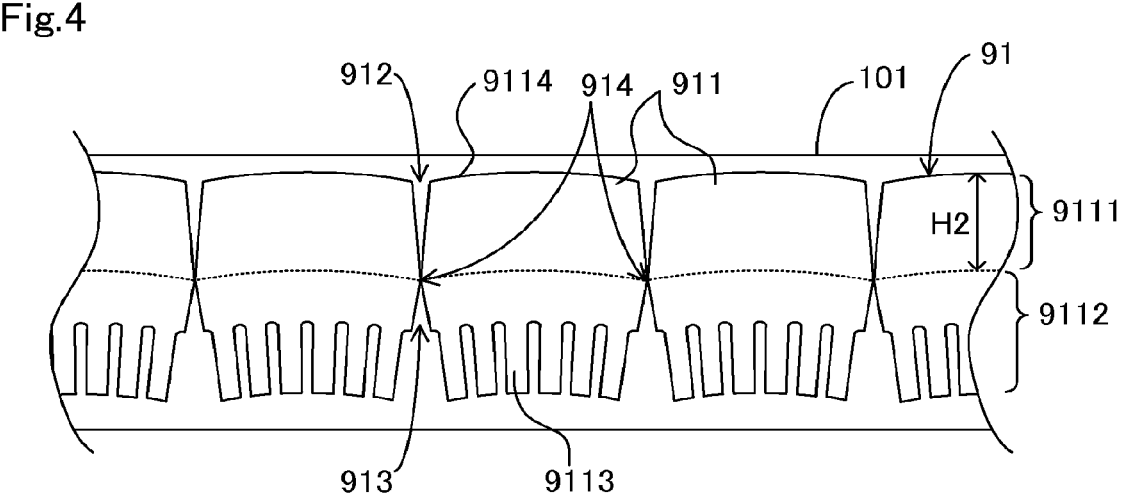
FIG. 4 is a view showing an example of component members of the stator core.

Next, referring to FIGS. 2A, 2B, 3, and 4, the detailed configuration of the stator core 21 will be described. FIGS. 2A and 2B are views showing a configuration example of the stator core 21. FIG. 2A shows a front view of the stator core 21 seen from the load side of the rotating electrical machine shown in FIG. 1, and FIG. 2B shows a side view of the stator core 21 seen from the side face side of the rotating electrical machine shown in FIG. 1. An alternate long and two short dashes line O in FIGS. 2A and 2B is a straight line parallel to the stack direction of the stator core 21 and shows the rotation axis of the rotor 1. FIGS. 3 and 4 are views each showing an example of component members of the stator core 21.

In FIGS. 2A and 2B, the stator core 21 has an annular-shaped first stack core 8 and an annular-shaped second stack core 9 having the same number of teeth. The stator core 21 is manufactured by alternately arranging the first and second stack cores 8 and 9 in the stack direction. The outside diameter of the second stack core 9 is larger than that of the first stack core 8. With the configuration, the radial fin 21*f* is formed in the stator core 21 itself.

As shown in FIG. 3, the first stack core 8 is manufactured by spirally stacking a first band-shaped core 81 punched out by press work from a band-shape steel plate 100 while making teeth 8113 matching with a first main core portion 8112 facing the inside. In FIGS. 2A and 2B, the number of stack times is three as an example. However, the present invention is not limited to the number. The number of stack times is set to an arbitrary number. The first band-shaped core 81 is configured by a plurality of first core pieces 811 mutually coupled by first couplers 814. Each of the first core pieces 811 has a substantially circular arc shape. Each of the first core pieces 811 has a first sub core portion 8111 for forming the radial fin 21*f* and the first main core portion 8112 in which the plurality of teeth 8113 are formed. The first main core portion 8112 corresponds to the core piece in the conventional technique. The width in the circumferential direction of each of the first core pieces 811 is set, as an example, to a width expressed by an angle whose multiple is not 360. In other words, in each of the first core pieces 811, the teeth 8113 are formed only by the number whose multiple is not the total number of the teeth 8113 of the stator core 21. Consequently, the first couplers 814 are not arranged linearly in the stack direction of the first stack core 8. As an example, the width in the circumferential direction of each of the first core pieces 811 is set so that the neighboring first couplers 814 do not overlap each other in the stack direction. At the time of stack, the first main core portion 8112 is disposed on the inner peripheral side of the first stack core 8, and the teeth 8113 are directed to the inner peripheral side of the first stack core 8. The first sub core portion 8111 is disposed on the outer peripheral side of the first stack core 8 at the time of stack. In FIG. 3, H1 denotes width in the radial direction of the first sub core portion 8111, and 8114 denotes an outer periphery of the first sub core portion 8111.

A first notch 812 is formed between the neighboring first sub core portions 8111, and a second notch 813 is formed between the neighboring first main core portions 8112. As a result, the first coupler 814 whose width in the radial direction is narrow is formed at the border between the first sub core portion 8111 and the first main core portion 8112. As an example, all of the first notches 812 formed in the first band-shaped core 81 have the same shape, and all of the second notches 813 formed in the first band-shaped core 81 also have the same shape. At the time of stack, the first notch 812 is widened to form a first dent 815 in a position where the first coupler 814 is provided in the outer peripheral face of the first stack core 8 as shown in FIGS. 2A and 2B. Since the first couplers 814 which are neighboring in the stack direction do not overlap each other as described above, the first dents 815 which are neighboring in the stack direction also do not overlap each other as shown in FIGS. 2A and 2B.

As shown in FIG. 4, the second stack core 9 is manufactured by spirally stacking a second band-shaped core 91 punched out by press work from a band-shape steel plate 101 while making teeth 9113 matching, with a second main core portion 9112 facing the inside. In FIGS. 2A and 2B, the number of stack times is three as an example. However, the present invention is not limited to the number. The number of stack times is set to an arbitrary number. The second band-shaped core 91 is configured by a plurality of second core pieces 911 mutually coupled by second couplers 914. Each of the second core pieces 911 has a substantially circular arc shape. Each of the second core pieces 911 has a second sub core portion 9111 for forming the radial fin 21*f* and the second main core portion 9112 in which the plurality of teeth 9113 are formed. The second main core portion 9112 corresponds to the core piece in the conventional technique. The width in the circumferential direction of each of the second core pieces 911 is set, as an example, to the same width as that in the circumferential direction of each of the first core pieces 811. Consequently, the second couplers 914 which are neighboring in the stack direction do not overlap each other. At the time of stack, the second main core portion 9112 is disposed on the inner peripheral side of the second stack core 9, and the teeth 9113 are directed to the inner peripheral side of the second stack core 9. The second sub core portion 9111 is disposed on the outer peripheral side of the second stack core 9. When width in the radial direction of the second sub core portion 9111 is expressed as H2, H2 is larger than H1 shown in FIG. 3. The width in the radial direction of the second main core portion 9112 is set to the same width as that in the radial direction of the first main core portion 8112 shown in FIG. 3. Accordingly, the outside diameter of the second stack core 9 is larger than that of the first stack core 8. In FIG. 4, 9114 denotes an outer periphery of the second sub core portion 9111.

A first notch 912 is formed between the neighboring second sub core portions 9111, and a second notch 913 is formed between the neighboring second main core portions 9112. As a result, the second coupler 914 whose width in the radial direction is narrow is formed at the border between the second sub core portion 9111 and the second main core portion 9112. As an example, all of the first notches 912 formed in the second band-shaped core 91 have the same shape, and all of the second notches 913 formed in the second band-shaped core 91 also have the same shape. At the time of stack, the first notch 912 is widened to form a second dent 915 in a position where the second coupler 914 is provided in the outer peripheral face of the second stack core 9 as shown in FIGS. 2A and 2B. Since the second couplers 914 which are neighboring in the stack direction do not overlap each other like the first couplers 814 as described above, the second dents 915 which are neighboring in the stack direction also do not overlap each other as shown in FIGS. 2A and 2B.

As described above, according to the embodiment, the stator core 21 is manufactured by the first stack core 8 formed by spirally stacking the first band-shaped cores 81 and the second stack core 9 formed by spirally stacking the second band-shaped cores 91. Consequently, as compared with the case of manufacturing a stator core by stacking annular-shaped cores punched out from a steel plate, the amount of using the steel plate can be reduced. The radial fin 21f is formed in the stator core 21 itself. Therefore, the cooling efficiency of the stator core 21 can be increased more than that in the conventional technique.

According to the embodiment, the first dents 815 are formed in the outer peripheral face of the first stack core 8, and the second dents 915 are formed in the outer peripheral face of the second stack core 9. Consequently, the surface area of the outer circumference of the stator core 21 is larger than that in the case of simply forming the radial fin 21f in the stator core itself. As a result, the cooling efficiency of the stator core 21 can be further increased.

According to the embodiment, the first dents 815 which are neighboring in the stack direction do not overlap each other. The second dents 915 are formed similarly. Consequently, the surface area of the stator core 21 can be made larger than that in the case where the neighboring dents overlap. As a result, the cooling efficiency can be further increased.

According to the embodiment, the first notch 812 is widened at the time of stack to form the first dent 815. Consequently, at the time of designing the width of the first dent 815 in the circumferential direction of the first stack core 8 to a desired width at which desired cooling efficiency is obtained, the open width of the first notch 812 can be set to a width smaller than the predetermined width. There is consequently an advantage that a press mold for forming the first notch 812 can be miniaturized and simplified. The wider the first dent 815 in the circumferential direction of the first stack core 8 is, the higher the cooling efficiency by natural convection is. The first notch 912 is similarly configured.

According to the embodiment, in the first stack core 8, the core pieces 811 have the same configuration, and the first coupler 814 is provided between the core pieces. Consequently, the intervals of the neighboring first notches 812 are the same, and the first dents 815 are arranged in the circumferential direction of the first stack core 8 at the same intervals. This can prevent the cooling efficiency of the first stack core 8 from locally deteriorating. The second stack core 9 is similarly configured. Further, in the embodiment, all of the first notches 812 have the same shape in the first band-shaped core 81. Therefore, all of the first dents 815 have the same shape, and the first stack core 8 can be cooled while suppressing unevenness. The first notch 912 is similarly configured.

In the above description, the neighboring first dents 815 and the neighboring second dents 915 in the stack direction do not overlap each other. However, the present invention is not limited to the configuration.

For example, the neighboring first dents 815 may be deviated in the circumferential direction in a state where they overlap each other partially. It can be realized by properly setting the width in the circumferential direction of each of the first core pieces 811. The neighboring second dents 915 are similarly configured. In this case as well, the surface area of the outer periphery of the stator core 21 is larger than that in the case of simply forming a radial fin in the stator core itself, so that the cooling efficiency can be increased.

Figure 5:
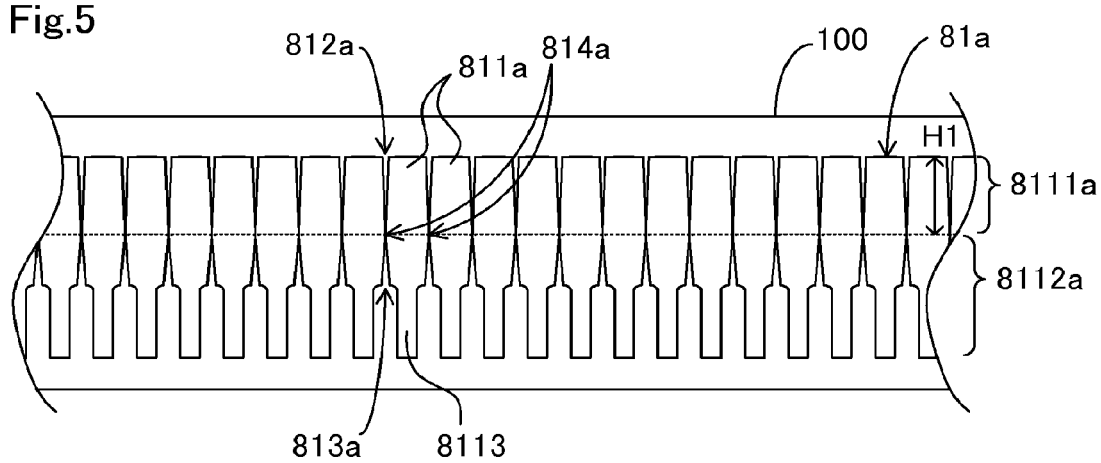
FIG. 5 is a view showing another configuration example of a first core piece.

For example, the neighboring first dents 815 may completely overlap each other. That is, the first dents 815 may be aligned in the stack direction of the first stack core 8. It can be realized by setting the width in the circumferential direction of each of the first core pieces 811 to a width expressed by an angle having 360 as a multiple. The neighboring second dents 915 are similarly configured. In this case as well, the surface area of the outer circumference of the stator core 21 is larger than that in the case of simply forming the radial fin in the stator core itself, so that the cooling efficiency can be increased. Further, in this case, as shown in FIG. 5, the number of teeth 8113 formed in the first main core portion 8112 may be set to one. The second core piece 911 is similarly configured. FIG. 5 is a view showing another configuration example of the first core piece. In FIG. 5, a first band-shaped core 81a is punched out by press work from the band-shaped steel plate 100, and is configured by a plurality of first core pieces 811a mutually coupled by first couplers 814a. Each of the first core pieces 811a has a substantially circular arc shape. Each of the first core pieces 811a has a first sub core portion 8111a for forming the radial fin 21f and the first main core portion 8112a in which one tooth 8113 is formed. At the time of stack, the first main core portion 8112a is disposed on the inner peripheral side of the first stack core 8, and the tooth 8113 is directed to the inner peripheral side of the first stack core 8. The first sub core portion 8111a is disposed on the outer peripheral side of the first stack core 8 at the time of stack. In FIG. 5, H1 denotes width in the radial direction of the first sub core portion 8111a. A first notch 812a is formed between the neighboring first sub core portions 8111a, and a second notch 813a is formed between the neighboring first main core portions 8112a. As a result, a first coupler 814a whose width in the radial direction is narrow is formed at the border between the first sub core portion 8111a and the first main core portion 8112a. At the time of stack, the first notch 812a is widened to form a first dent in a position where the first coupler 814a is provided in the outer peripheral face of the first stack core 8.

For example, whether or not neighboring dents are set so as not to overlap each other or so as to partly overlap each other or completely overlap each other may be arbitrarily determined for each of the first dent 815 and the second dent 915.

Although nothing is formed in each of the outer periphery 8114 of the first sub core portion 8111 shown in FIG. 3 and the outer periphery 9114 of the second sub core portion 9111 shown in FIG. 4 in the above description, a notch becoming as a dent may be also formed in the outer peripheries 8114 and 9114. In this case, the surface area of the stator core 21 is further increased.

Second Embodiment

Figure 6A:
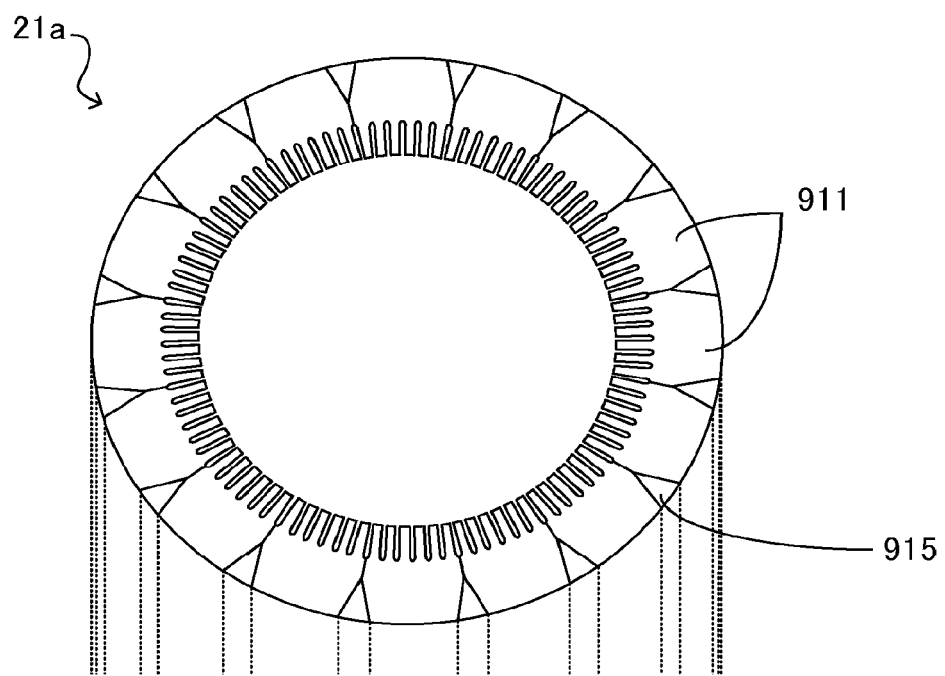
FIGS. 6A and 6B are views showing a configuration example of a stator core.
Figure 6B:
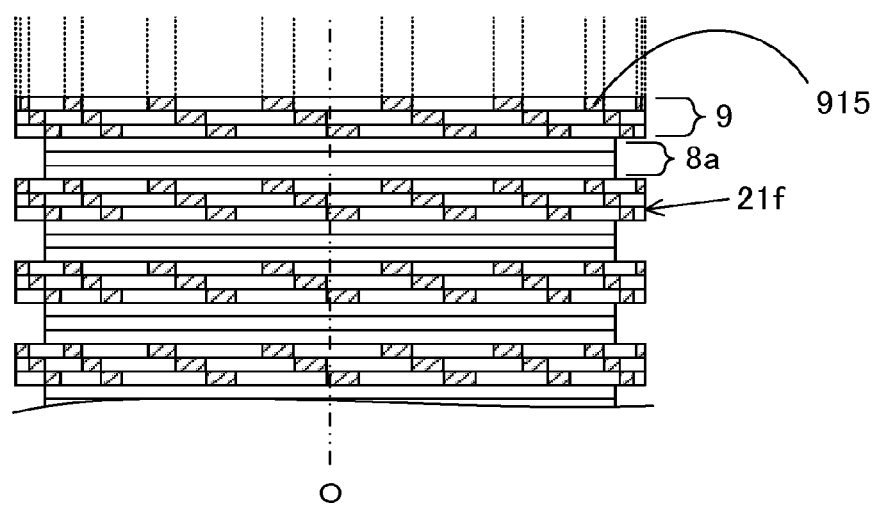

Next, the configuration of a rotating electrical machine according to a second embodiment of the present invention will be described. The rotating electrical machine of the embodiment is different from the rotating electrical machine shown in FIG. 1 only with respect to the configuration of the stator core 21. In the following, referring to FIGS. 6A, 6B, and 7, the different point will be mainly described. FIGS. 6A and 6B are views showing a configuration example of a stator core 21a. FIG. 6A shows a front view of the stator core 21a seen from the load side of the rotating electrical machine shown in FIG. 1, and FIG. 6B shows a side view of the stator core 21a seen from the side face of the rotating electrical machine shown in FIG. 1. An alternate long and two short dashes line O in FIGS. 6A and 6B is a straight line parallel to the stack direction of the stator core 21a and shows the rotation axis of the rotor 1. In FIGS. 6A and 6B, like reference numerals designate identical components to those shown in FIGS. 2A and 2B. FIG. 7 is a view showing an example of component members of the stator core 21a.

In FIGS. 6A and 6B, the stator core 21a has an annular-shaped first stack core 8a and an annular-shaped second stack core 9 having the same number of teeth. The stator core 21a is manufactured by alternately arranging the first and second stack cores 8a and 9 in the stack direction. The outside diameter of the second stack core 9 is larger than that of the first stack core 8a. With the configuration, the radial fin 21f is formed in the stator core 21a itself.

As shown in FIG. 7, the first stack core 8*a* is manufactured by spirally stacking a first band-shaped core 81*b* punched out by press work from the band-shape steel plate 100 while making the teeth 8113 matching with a first main core portion 8112*b* facing the inside. In FIGS. 6A and 6B, the number of stack times is three as an example. However, the present invention is not limited to the number. The number of stack times is set to an arbitrary number. The first band-shaped core 81*b* is configured by a plurality of first core pieces 811*b* mutually coupled by first couplers 814*b*. Each of the first core pieces 811*b* has a substantially circular arc shape. Each of the first core pieces 811*b* has a first sub core portion 8111*b* for forming the radial fin 21*f* and the first main core portion 8112*b* in which the plurality of teeth 8113 are formed. At the time of stack, the first main core portion 8112*b* is disposed on the inner peripheral side of the first stack core 8*a*, and the teeth 8113 are directed to the inner peripheral side of the first stack core 8*a*. The first sub core portion 8111*b* is disposed on the outer peripheral side of the first stack core 8*a* at the time of stack. In FIG. 7, H1 denotes width in the radial direction of the first sub core portion 8111*b*, and 8114*b* denotes an outer periphery of the first sub core portion 8111*b*.

A second notch 813*b* is formed between the neighboring first main core portions 8112*b*. As a result, the first coupler 814 whose width in the radial direction is narrow is formed between the neighboring outer peripheries 8114*b*.

As shown in FIG. 4, the second stack core 9 is manufactured by spirally stacking the second band-shaped core 91 punched out by press work from the band-shape steel plate 101 while making teeth 9113 matching, with a second main core portion 9112 facing the inside. Since the subsequent process is similar to that of the first embodiment, the description will not be repeated. Width H2 in the radial direction of the second sub core portion 9111 shown in FIG. 4 is larger than H1 in FIG. 7. The width in the radial direction of the second main core portion 9112 shown in FIG. 4 is set to the same width as that in the radial direction of the first main core portion 8112*b*. Accordingly, the outside diameter of the second stack core 9 is larger than that of the first stack core 8*a*.

As described above, according to the embodiment, the second dent 915 is formed in the outer peripheral face of the second stack core 9. Consequently, the surface area of the outer periphery of the stator core 21*a* is larger than that in the case of simply forming the radial fin in the stator core itself. As a result, the cooling efficiency of the stator core 21*a* can be increased.

Third Embodiment

Figure 9:
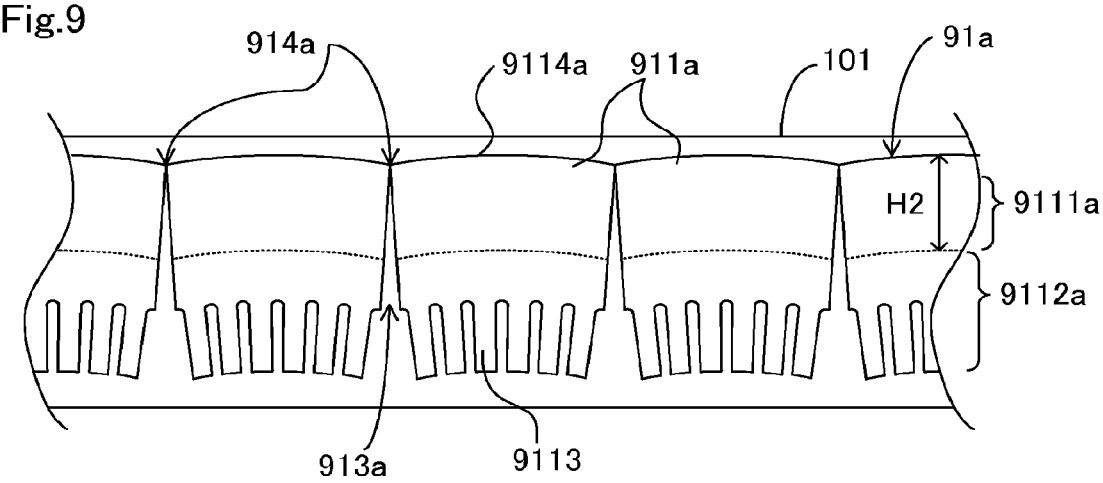
FIG. 9 is a view showing an example of component members of the stator core.

Next, the configuration of a rotating electrical machine according to a third embodiment of the present invention will be described. The rotating electrical machine of the embodiment is different from the rotating electrical machine shown in FIG. 1 only with respect to the configuration of the stator core 21. In the following, referring to FIGS. 8A, 8B, and 9, the different point will be mainly described. FIGS. 8A and 8B are views showing a configuration example of a stator core 21*b*. FIG. 8A shows a front view of the stator core 21*b* seen from the load side of the rotating electrical machine shown in FIG. 1, and FIG. 8B shows a side view of the stator core 21 seen from the side face of the rotating electrical machine shown in FIG. 1. An alternate long and two short dashes line O in FIGS. 8A and 8B is a straight line parallel to the stack direction of the stator core 21*b* and shows the rotation axis of the rotor 1. In FIGS. 8A and 8B, like reference numerals designate identical components to those shown in FIGS. 2A and 2B. FIG. 9 is a view showing an example of component members of the stator core 21*b*.

In FIGS. 8A and 8B, the stator core 21*b* has the annular-shaped first stack core 8 and an annular-shaped second stack core 9*a* having the same number of teeth. The stator core 21*b* is manufactured by alternately arranging the first and second stack cores 8 and 9*a* in the stack direction. The outside diameter of the second stack core 9*a* is larger than that of the first stack core 8. With the configuration, the radial fin 21*f* is formed in the stator core 21*b* itself.

As shown in FIG. 3, the first stack core 8 is manufactured by spirally stacking the first band-shaped core 81 punched out by press work from the band-shape steel plate 100 while making the teeth 8113 matching with the first main core portion 8112 facing the inside. Since the following process is similar to that of the first embodiment, the description will not be repeated.

As shown in FIG. 9, the second stack core 9*a* is manufactured by spirally stacking the second band-shaped core 91*a* punched out by press work from the band-shape steel plate 101 while making teeth 9113 matching, with a second main core portion 9112*a* facing the inside. In FIGS. 8A and 8B, the number of stack times is three as an example. However, the present invention is not limited to the number. The number of stack times is set to an arbitrary number. The second band-shaped core 91*a* is configured by a plurality of second core pieces 911*a* mutually coupled by second couplers 914*a*. Each of the second core pieces 911*a* has a substantially circular arc shape. Each of the second core pieces 911*a* has a second sub core portion 9111*a* for forming the radial fin 21*f* and a second main core portion 9112*a* in which the plurality of teeth 9113 are formed. At the time of stack, the second main core portion 9112*a* is disposed on the inner peripheral side of the second stack core 9*a*, and the teeth 9113 are directed to the inner peripheral side of the second stack core 9*a*. The second sub core portion 9111*a* is disposed on the outer peripheral side of the second stack core 9*a* at the time of stack. In FIG. 9, H2 denotes width in the radial direction of the second sub core portion 9111*a*, and 9114*a* denotes the outer periphery of the second sub core portion 9111*a*. A second notch 913*a* is formed between the neighboring second main core portions 9112*a*. As a result, the second coupler 914*a* whose width in the radial direction is narrow is formed between the neighboring outer peripheries 9114*a*. The width H2 in the radial direction of the second sub core portion 9111*a* shown in FIG. 9 is larger than H1 in FIG. 3. The width in the radial direction of the first main core portion 8112 shown in FIG. 3 is set to the same width as that in the radial direction of the second main core portion 9112*a*. Accordingly, the outside diameter of the second stack core 9*a* is larger than that of the first stack core 8.

As described above, according to the embodiment, the first dent 815 is formed in the outer peripheral face of the first stack core 8. Consequently, the surface area of the outer periphery of the stator core 21*b* is larger than that in the case of simply forming the radial fin in the stator core itself. As a result, the cooling efficiency of the stator core 21*b* can be increased.

Each of the rotating electrical machines according to the first to third embodiments described above can be applied to electric motors and power generators in general and can be also applied to, for example, an electric motor of an elevating machine (such as an elevator), an electric motor of a processor (such as a machine tool), an electric motor and a power generator in a vehicle or the like, a wind power generator, and other industrial electric motors, industrial power generators, and the like.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A rotating electrical machine comprising:
   a stator including a stator core comprising:
      an annular-shaped first stack core comprising:
         a plurality of first core pieces spirally stacked; and
         first couplers mutually coupling the plurality of first core pieces;
      an annular-shaped second stack core comprising:
         a plurality of second core pieces spirally stacked; and
         second couplers mutually coupling the plurality of second core pieces;
      an outside shape of the second stack core being larger than an outside shape of the first stack core in a radial direction;
      the first stack core and the second stack core being alternately arranged in a stack direction; and
   a rotor provided on an inner peripheral side of the first stack core and the second stack core.

2. The rotating electrical machine according to claim 1, wherein each of the plurality of first core pieces includes
   a first main core portion provided on the inner peripheral side of the first stack core and having teeth formed on the inner peripheral side, and
   a first sub core portion provided on an outer peripheral side of the first main core portion,
   wherein the plurality of first core pieces are mutually coupled by the first couplers each provided at border between the first main core portion and the first sub core portion, and
   wherein the first stack core comprises first dents provided on an outer peripheral face of the first stack core, the first dents being formed in positions where the first couplers are provided.

3. The rotating electrical machine according to claim 2, wherein the first dents have the same shape.

4. The rotating electrical machine according to claim 2, wherein the first dents are arranged in the stack direction.

5. The rotating electrical machine according to claim 2, wherein the first dents neighboring in the stack direction are provided so as to be deviated in a circumferential direction of the first stack core.

6. The rotating electrical machine according to claim 5, wherein the first dents neighboring in the stack direction are provided so as not to overlap each other in the stack direction.

7. The rotating electrical machine according to claim 2, wherein each of the plurality of second core pieces includes
   a second main core portion provided on the inner peripheral side of the second stack core and having teeth formed on the inner peripheral side, and
   a second sub core portion provided on an outer peripheral side of the second main core portion,
   wherein the plurality of second core pieces are mutually coupled by the second couplers each provided at border between the second main core portion and the second sub core portion, and
   wherein the second stack core comprises second dents provided on an outer peripheral face of the second stack core, the second dents being formed in positions where the second couplers are provided.

8. The rotating electrical machine according to claim 7, wherein the first dents are arranged in the stack direction, and
   wherein the second dents are arranged in the stack direction.

9. The rotating electrical machine according to claim 7, wherein the first dents have the same shape, and
   wherein the second dents have the same shape.

10. The rotating electrical machine according to claim 7, wherein the first dents neighboring in the stack direction are provided so as to be deviated in a circumferential direction of the first stack core, and
    wherein the second dents neighboring in the stack direction are provided so as to be deviated in a circumferential direction of the second stack core.

11. The rotating electrical machine according to claim 10, wherein the first dents neighboring in the stack direction are provided so as not to overlap each other in the stack direction, and
    wherein the second dents neighboring in the stack direction are provided so as not to overlap each other in the stack direction.

12. The rotating electrical machine according to claim 1, wherein each of the plurality of second core pieces includes
    a third main core portion provided on an inner peripheral side of the second stack core and having teeth formed on the inner peripheral side, and
    a third sub core portion provided on an outer peripheral side of the main core portion,
    wherein the plurality of second core pieces are mutually coupled by the second couplers each provided at border between the main core portion and the sub core portion, and
    wherein the second stack core comprises third dents provided on an outer peripheral face of the second stack core, the third dents being formed in positions where the second couplers are provided.

13. The rotating electrical machine according to claim 12, wherein the third dents are arranged in the stack direction.

14. The rotating electrical machine according to claim 12, wherein the third dents have the same shape.

15. The rotating electrical machine according to claim 12, wherein the third dents neighboring in the stack direction are provided so as to be deviated in a circumferential direction of the second stack core.

16. The rotating electrical machine according to claim 15, wherein the third dents neighboring in the stack direction are provided so as not to overlap each other in the stack direction.

17. A rotating electrical machine comprising:
    a stator including a stator core comprising:
       an annular-shaped first stack core comprising:
          a plurality of first core pieces spirally stacked; and
          first couplers mutually coupling the plurality of first core pieces;
       an annular-shaped second stack core comprising:
          a plurality of second core pieces spirally stacked; and
          second couplers mutually coupling the plurality of second core pieces;
       an outside shape of the second stack core being larger than an outside shape of the first stack core in a radial direction; and
    a rotor provided on an inner peripheral side of the first and second stack cores.

* * * * *